(12) United States Patent
Okano (10) Patent No.: US 9,235,912 B2
(45) Date of Patent: Jan. 12, 2016

(54) IMAGE DISPLAY DEVICE, IMAGE DISPLAY METHOD AND RECORDING MEDIUM RECORDING IMAGE DISPLAY CONTROL PROGRAM

(75) Inventor: Mitsuru Okano, Akiruno (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 100 days.

(21) Appl. No.: 13/585,161

(22) Filed: Aug. 14, 2012

(65) Prior Publication Data

US 2013/0050219 A1  Feb. 28, 2013

(30) Foreign Application Priority Data

Aug. 24, 2011  (JP) .................................. 2011-182291

(51) Int. Cl.
*G06T 11/60* (2006.01)
*G06T 15/02* (2011.01)
*G06F 15/02* (2006.01)

(52) U.S. Cl.
CPC ............ *G06T 11/60* (2013.01); *G06F 15/0225* (2013.01)

(58) Field of Classification Search
CPC ..... G06T 11/206; G06T 11/20; G06F 3/0481; G06F 17/246; H04L 41/22
See application file for complete search history.

(56) References Cited

U.S. PATENT DOCUMENTS

| | | | |
|---|---|---|---|
| 5,583,538 A * | 12/1996 | Watanabe et al. | 345/684 |
| 2002/0034317 A1 * | 3/2002 | Matsunaga et al. | 382/106 |
| 2003/0182333 A1 * | 9/2003 | Good et al. | 708/131 |
| 2008/0152214 A1 * | 6/2008 | Sawachi | 382/154 |
| 2009/0254597 A1 * | 10/2009 | Karoji | 708/130 |

FOREIGN PATENT DOCUMENTS

| | | |
|---|---|---|
| JP | 61-275963 A | 12/1986 |
| JP | 08-185529 A | 7/1996 |
| JP | 2000-181903 A | 6/2000 |
| JP | 2003016461 A | 1/2003 |
| JP | 2003-131655 A | 5/2003 |

OTHER PUBLICATIONS

"The Projectile 'Lab'" http://www.farraguttn.com/science/milligan/physics/ProjLab.htm. Archived on Sep. 26, 2008. Retrieved on Mar. 22, 2015 from <https://web.archive.org/web/20080926152512/http://www.farraguttn.com/science/milligan/physics/ProjLab.htm>.*

(Continued)

*Primary Examiner* — Zhengxi Liu
(74) *Attorney, Agent, or Firm* — Holtz, Holtz, Goodman & Chick PC (57) ABSTRACT

An image display device includes a display unit, a graph display control unit, a display range displacement unit, a plotted point change unit and a graph update control unit. The graph display control unit displays an approximate graph for plotted points on an image display region to which a coordinate system is set. The display range displacement unit displaces a display range of the coordinate system with an image in the image display region fixed. Responding to the display range being displaced, the plotted point change unit changes coordinate values of the plotted points in accordance with displacements of the display range to maintain positions of the plotted points before and after the display range being displaced, and updates display of the plotted points, and the graph update control unit updates a content displayed by the graph display control unit.

6 Claims, 7 Drawing Sheets

(56) References Cited

OTHER PUBLICATIONS

"Transformation of Coordinates" http://www.math10.com/en/geometry/analytic-geometry/geometry1/coordinates-transformation.html. Archived on May 4, 2008. Retrieved on Mar. 23, 2015 from <https://web.archive.org/web/20080504154519/http://www.math10.com/en/geometry/analytic-geometry/geometry1/coordinates-transformation.html>.*

Extended European Search Report (EESR) dated Jan. 25, 2013 (in English) issued in counterpart European Application No. 12180674.9.

Casio Worldwide Education Website: "fx-CG10 fx-CG20 Software User's Guide": pp. i-vi, 1-1 to1-7, 5-1 to 5-12, 5-52 to 5-61, 15-1 to 15-18: Nov. 9, 2010 (in English).

Japanese Office Action (and English translation thereof) dated Jul. 7, 2015, issued in counterpart Japanese Application No. 2011-182291.

Katahara, "Eye Closure Detection Using Eyelid Motion in Face Image Sequences", Technical Report of IEICE, Japan, The Institute of Electronics, Information and Communication Engineers, May 16, 1997, vol. 97, No. 41, pp. 81-88.

* cited by examiner

IMAGE DISPLAY DEVICE, IMAGE DISPLAY METHOD AND RECORDING MEDIUM RECORDING IMAGE DISPLAY CONTROL PROGRAM

BACKGROUND OF THE INVENTION

1. Field of the Invention

The present invention relates to an image display device, an image display method, and a recording medium which records an image display control program therein.

2. Description of the Related Art

Conventionally, in an image display device which displays picked-up images, measurement data of a moving object is drawn as a graph with a picked-up image of the moving object displayed as the background so that the shape of the graph and a physical event are correlated with each other for study. In addition, in such an electronic device, when a user plots a plurality of points (plotting) on an image, a graph fit for the plotted points is calculated, and displayed in such a way as to be superimposed on the image.

BRIEF SUMMARY OF THE INVENTION

However, according to the technology described above, when a coordinate system superimposed on an image is displaced, plotted points are displaced with the coordinate system, and hence the plotted points are shifted from their original positions on the image. Consequently, it becomes necessary to re-perform plotting on the image.

Objects of the present invention are to provide an image display device, an image display method, and a recording medium which records an image display control program therein to eliminate time and effort to re-perform plotting on an image even when a coordinate system superimposed on the image is displaced.

In order to achieve at least one of the objects described above, according to an aspect of the present invention, there is provided an image display device including: a display unit which displays an image in a display screen; a coordinate system setting unit which sets a coordinate system determined by a plurality of coordinate axes to an image display region of the display screen; a plotting unit which forms a plurality of plotted points on the image display region to which the coordinate system is set, on the basis of a user operation; a plotted point data storage unit which stores coordinate values of the plotted points in the coordinate system, the coordinate values being correlated with the image; a graph display control unit which (i) obtains the coordinate values of the plotted points, (ii) creates an approximate graph for a set of the plotted points, (iii) displays the approximate graph on the image display region to which the coordinate system is set, and (iv) displays an expression for the approximate graph on the display unit; a display range displacement unit which displaces a display range of the coordinate system, the display range being set on the image in the image display region, with the image fixed, on the basis of a user operation; a displacement storage unit which stores displacements in directions of the coordinate axes of the display range displaced by the display range displacement unit; a plotted point change unit which, in response to the display range being displaced by the display range displacement unit, changes the coordinate values of the plotted points in accordance with the displacements so as to maintain positions of the plotted points on the image before and after the display range being displaced, and updates display of the plotted points on the basis of the changed coordinate values; and a graph update control unit which, in response to the display range being displaced by the display range displacement unit, updates a display content displayed by the graph display control unit, on the basis of a user operation.

DETAILED DESCRIPTION OF THE INVENTION

In the following, referring to the accompanying drawings, an embodiment of the present invention is described. However, the present invention is not limited to the drawings or the embodiment.

[1. Configuration of Scientific Calculator]

[1-1. External Appearance]

Figure 1:
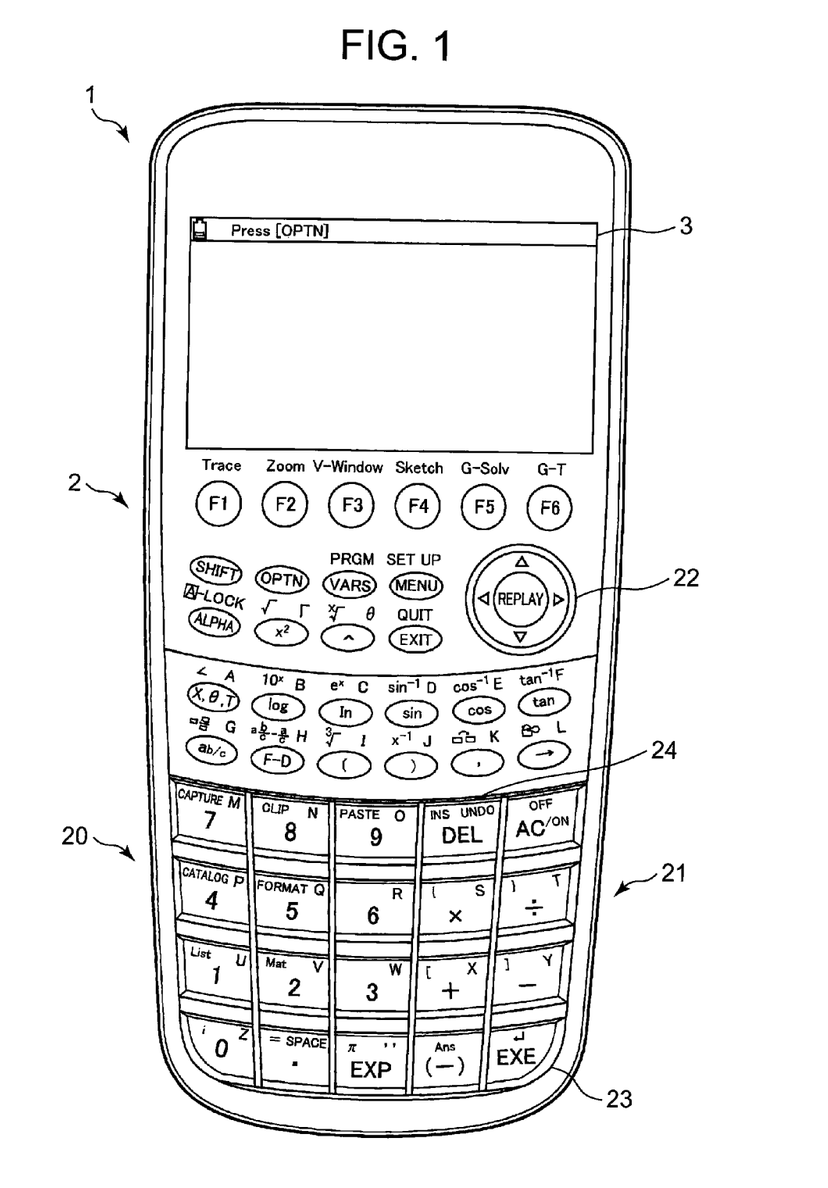
FIG. 1 is a plan view schematically showing the configuration of a scientific calculator.

FIG. 1 is a conceptual diagram schematically showing the configuration of a scientific calculator 1.

As shown in FIG. 1, the scientific calculator 1 includes an input key set 2 having various keys, and a display 3.

The input key set 2 is a key set to receive input operations for expression elements such as numeral values and operators, and to receive instruction operations for various types of processing. The input key set 2 includes keys to which functions are respectively assigned. In the embodiment, the input key set 2 includes a numeric keypad 20, operator keys 21, a cursor key 22, an EXE (executor) key 23, and a DEL (delete) key 24.

The numeric keypad 20 receives input operations to input numeral values. The operator keys 21 receive input operations to input various operators such as four arithmetic operators and brackets.

The cursor key 22 is pressed, for example, to move a cursor in a predetermined direction. The cursor indicates a position of a target for editing or a position of a target for selection in the display 3. In the embodiment, the cursor key 22 is configured to be able to input four directions, up, down, left and right.

The EXE key 23 receives input operations to input execution instructions to perform processing and to input decision instructions. The EXE key 23 functions, for example, as a key to instruct to perform arithmetic processing after an expression is inputted. The DEL key 24 receives delete operations to delete numeral values, operators or the like displayed on the display 3.

The display 3 is constituted of an LCD (Liquid Crystal Display), an ELD (Electronic Luminescent Display) or the like. The display 3 displays letters, symbols, expressions, results of arithmetic, coordinate axes, graphs and the like in response to operations on the input key set 2 or the like, and also displays various data necessary to use the scientific calculator 1. On the display 3 in the embodiment, an X axis and a Y axis are displayed in the lateral direction and the longitudinal direction, respectively, so as to display an XY coordinate system determined by the X axis and the Y axis. In addition, the display 3 is provided with a touch panel 30 to be integrated therewith all over the display screen thereof.

[1-2. Functional Configuration]

Next, the functional configuration of the scientific calculator 1 is described.

Figure 2:
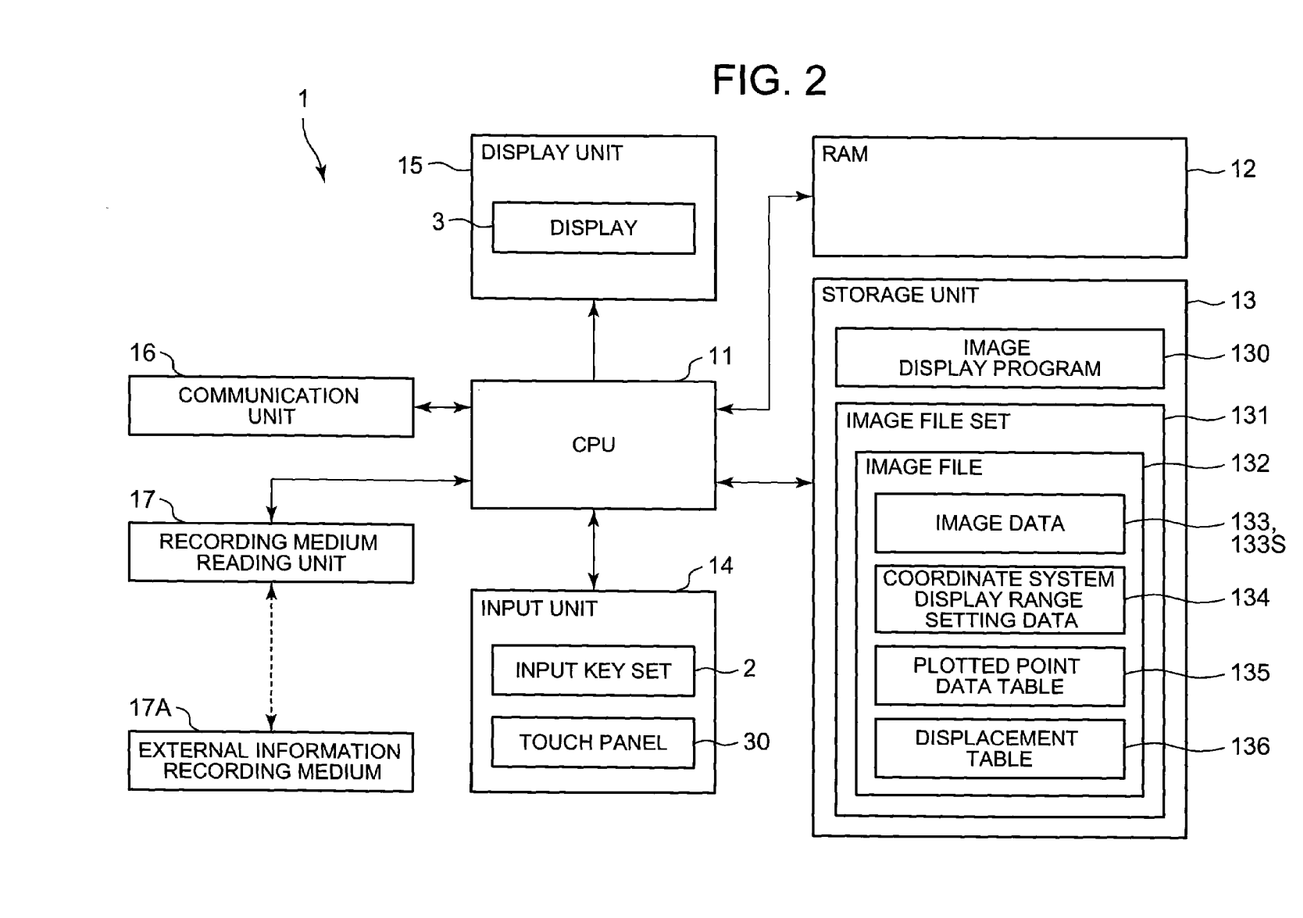
FIG. 2 is a block diagram showing the functional configuration of the scientific calculator.

FIG. 2 is a block diagram schematically showing the functional configuration of the scientific calculator 1.

As shown in FIG. 2, the scientific calculator 1 includes an input unit 14, a display unit 15, a communication unit 16, a recording medium reading unit 17, a RAM (Random Access Memory) 12, a storage unit 13, and a CPU (Central Processing Unit) 11.

The input unit 14 includes the input key set 2 and the touch panel 30, and outputs signals corresponding to pressed keys or pressed points on the touch panel 30 to the CPU 11.

The display unit 15 includes the display 3, and displays various pieces of information in accordance with display signals from the CPU 11.

The communication unit 16 is connectable to the Internet, thereby being communicable with external devices connected to the Internet.

The recording medium reading unit 17 reads information from an external information recording medium 17A, which is attached to the recording medium reading unit 17 freely detachably, such as a USB memory.

The RAM 12 is a volatile memory which temporarily stores information, and has a plurality of work areas where various programs to be executed, data for the various programs, and the like are stored.

The storage unit 13 is a nonvolatile memory constituted of a ROM (Read Only Memory) or the like, and stores various programs and data. More specifically, the storage unit 13 stores an image display program 130 (an image display control program) as a program of the present invention, and an image file set 131.

The image display program 130 is a program to make the CPU 11 perform image display processing (shown in FIGS. 3 and 4) described below.

The image file set 131 includes a plurality of image files 132 on images displayable on the display 3. The image files 132 are received via the communication unit 16.

Each image file 132 includes image data 133, coordinate system display range setting data 134, a plotted point data table 135, and a displacement table 136 which are correlated with each other.

The image data 133 is data on an image displayable in such a way that the image and a coordinate system are superimposed on each other. The image data 133 shows a predetermined shape (a parabola or a straight line, for example) which can be approximated by a graph. As the image of the image data 133, an image different from an actual event, such as a drawn image, may be used. Furthermore, the predetermined shape which can be approximated by a graph is not limited to a parabola or a straight line, and hence may be another shape.

The coordinate system display range setting data 134 is data on a display range of the XY coordinate system (the upper limit values and the lower limit values of the X axis and the Y axis) which should be set to be fit for an image display region in the display screen. The coordinate system display range setting data 134 is not always necessary to be included in the image file 132.

The plotted point data table 135 is a table where X coordinate values and Y coordinate values of plotted points P (shown in FIG. 5B) are stored in the image display processing (shown in FIGS. 3 and 4) described below. In the plotted point data table 135 in the embodiment, a coordinate value set of plotted points P is stored for each list number. More specifically, a coordinate value set correlated with one list number and a coordinate value set correlated with another list number are stored as coordinate value sets of different groups.

If the XY coordinate system is translated (parallel displaced) in the image display processing (shown in FIGS. 3 and 4) described below, displacements ($\Delta(X, Y)$) in the X axis direction and the Y axis direction, a number (a displacement number, hereinbelow) ($\Delta 1$, $\Delta 2$ or the like) showing the number of times the XY coordinate system has been translated, and a list number on a coordinate value set of plotted points P before the XY coordinate system being translated are correlated with each other, and stored in the displacement table 136.

The CPU 11 performs central control over the components of the scientific calculator 1. More specifically, the CPU 11 loads programs specified from among system programs and various application programs stored in the storage unit 13 into the RAM 12, and performs processing in cooperation with the programs loaded into the RAM 12.

[2. Operation of Scientific Calculator]

Figure 3:
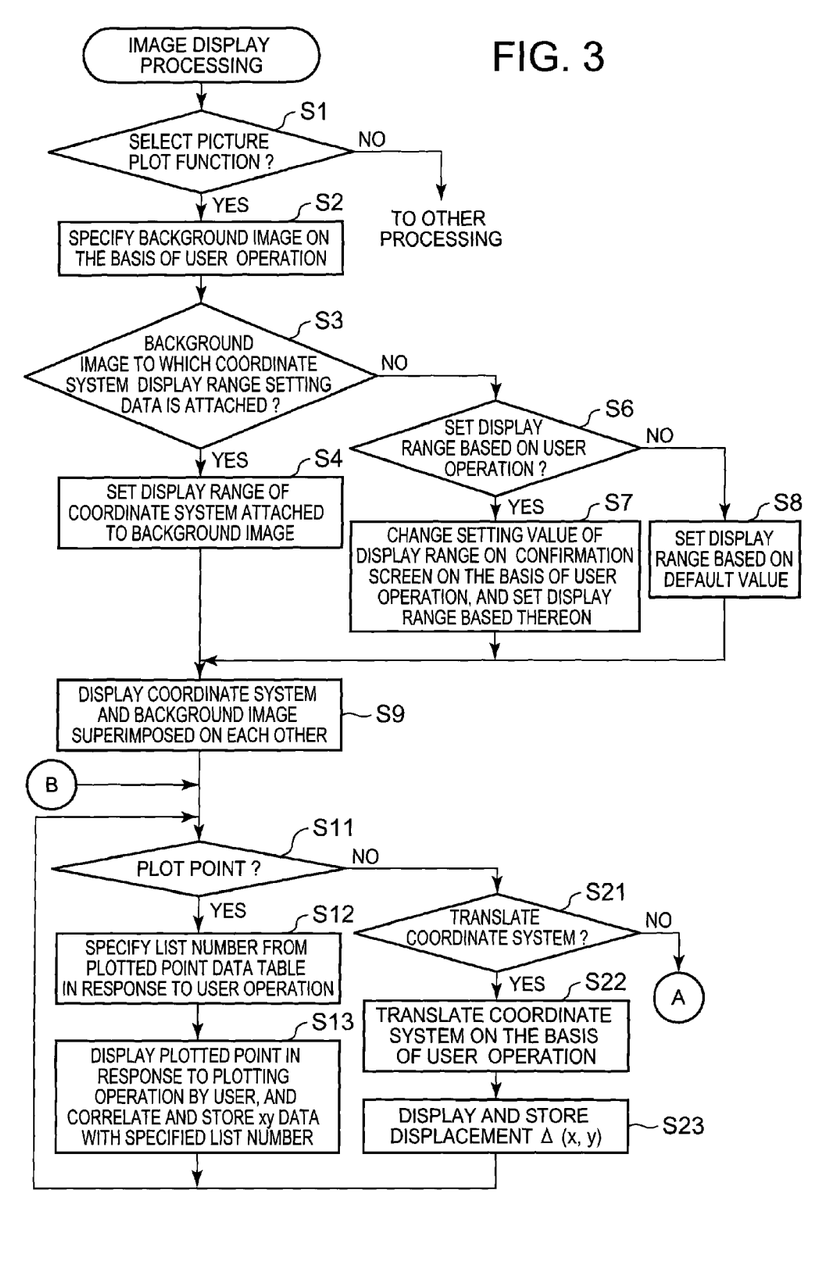
FIG. 3 is a first part of a flowchart of image display processing.
Figure 4:
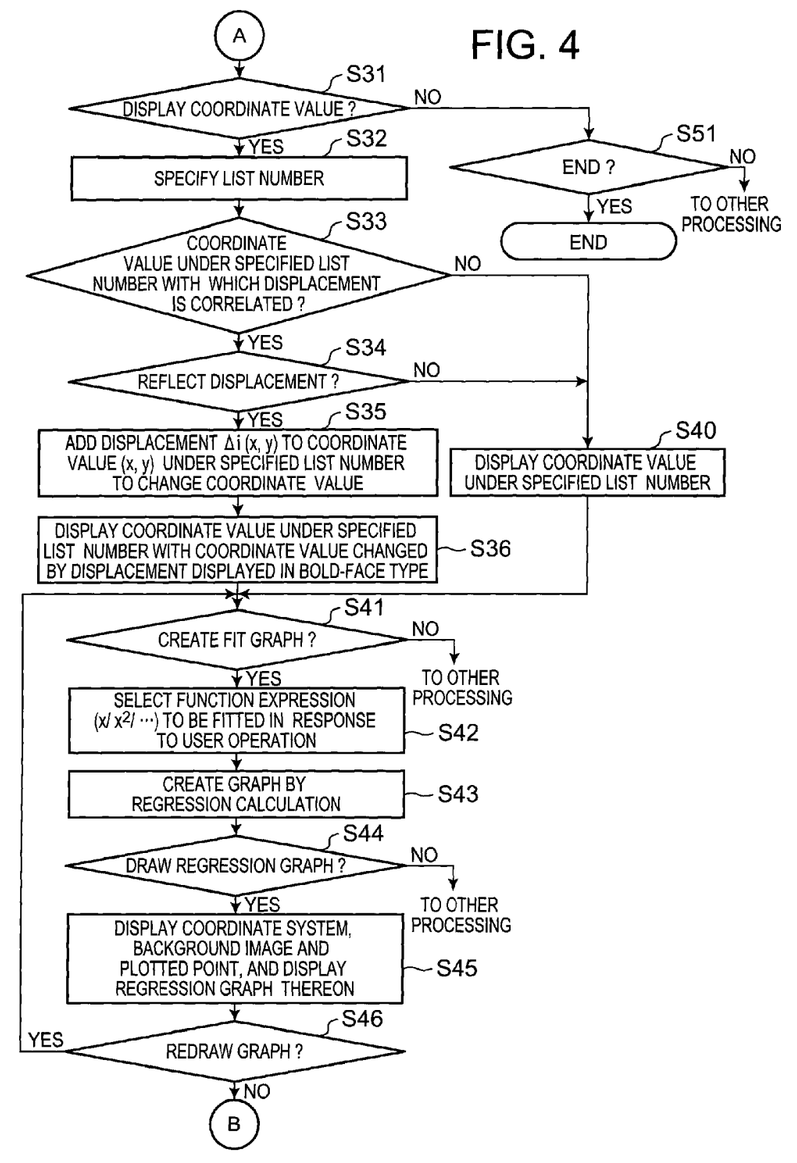
FIG. 4 is a second part of the flowchart of the image display processing.

Next, operation of the scientific calculator 1 is described, referring to FIGS. 3 and 4.

FIGS. 3 and 4 show a flowchart to explain the image display processing performed by the CPU 11 reading the image display program 130 from the storage unit 13.

As shown in FIG. 3, in the image display processing, the CPU 11 first determines whether or not a user chooses to activate a function (a plotting-on-picture function or a picture plot function, hereinbelow) to form plotted points P on an image (Step S1). When determining that the user does not choose to activate the picture plot function (Step S1; NO), the CPU 11 moves to other processing.

On the other hand, when determining that the user chooses to activate the picture plot function (Step S1; YES), the CPU 11 specifies one image data 133 in the image file set 131 as specified image data 133S on the basis of a user operation (Step S2). The image of the specified image data 133S is displayed as the background for plotted points P in the processing described below.

Next, the CPU 11 determines whether or not the coordinate system display range setting data 134 is attached to the specified image data 133S (Step S3).

When determining that the coordinate system display range setting data 134 is attached to the specified image data 133S (Step S3; YES), the CPU 11 sets the XY coordinate system in such a way that the XY coordinate system is superimposed on the image display region of the display 3 on the basis of the display range of the XY coordinate system shown by the coordinate system display range setting data 134 (Step S4), and then moves to Step S9.

On the other hand, when determining that the coordinate system display range setting data 134 is not attached to the specified image data 133S (Step S3; NO), the CPU 11 determines whether or not an operation to set the display range of the XY coordinate system is performed (Step S6).

When determining that the operation to set the display range of the XY coordinate system is performed (Step S6; YES), the CPU 11 displays a confirmation screen to confirm a default value for the display range of the XY coordinate system on the display 3, changes the display range on the basis of a user operation thereon, and sets the XY coordinate system in such a way that the XY coordinate system is superimposed on the image display region of the display 3 on the basis of the changed display range (Step S7), and then moves to Step S9.

On the other hand, when determining that the operation to set the display range of the XY coordinate system is not performed (Step S6; NO), the CPU 11 sets the XY coordinate system in such a way that the XY coordinate system is superimposed on the image display region of the display 3 on the basis of the default value for the display range of the XY coordinate system (Step S8).

Next, the CPU 11 displays the image of the specified image data 133S and the XY coordinate system in such a way that the image thereof and the XY coordinate system are superimposed on each other (Step S9). More specifically, the CPU 11 displays the coordinate axes of the XY coordinate system within the display range, which is set at Step S4, S7 or S8, and scale marks on the coordinate axes, on the image of the specified image data 133S.

Next, the CPU 11 determines whether or not an operation to form plotted points P on an image (the image display region to which the coordinate system is set) is performed (Step S11). When determining that the operation to form plotted points P on an image is performed (Step S11; YES), the CPU 11 specifies a list number in the plotted point data table 135 in response to a user operation (Step S12).

Next, the CPU 11 displays plotted points P on the image of the specified image data 133S in response to a plotting operation by the user, correlates coordinate values of the plotted points P in the XY coordinate system with the specified list number, and stores the coordinate values correlated with the specified list number in the plotted point data table 135 (Step S13), and then moves to Step S11. At Step S13, the coordinate values of the plotted points P are correlated with the image of the specified image data 133S and stored.

On the other hand, when determining that the operation to form plotted points P on an image is not performed (Step S11; NO), the CPU 11 determines whether or not an operation to translate the XY coordinate system is performed (Step S21).

When determining that the operation to translate the XY coordinate system is performed (Step S21; YES), the CPU 11 translates, on the basis of a user operation, the XY coordinate system on the image of the specified image data 133S with the image thereof fixed on the display 3 (Step S22). Consequently, the display range of the XY coordinate system is changed (translated).

Next, the CPU 11 displays the displacements ($\Delta(X, Y)$) in the X axis direction and the Y axis direction on the display 3, and also correlates the displacements ($\Delta(X,Y)$), the displacement number ($\Delta 1$, $\Delta 2$ or the like) showing the number of times the XY coordinate system has been translated, and the list number for the coordinate value set of the plotted points P before the XY coordinate system being translated with each other, and stores the correlated displacements, displacement number, and list number in the displacement table 136 (Step S23), and then moves to Step S11.

On the other hand, when determining that the operation to translate the XY coordinate system is not performed (Step S21; NO), as shown in FIG. 4, the CPU 11 determines whether or not an operation to display a coordinate value set of the plotted point data table 135 is performed (Step S31).

When determining that the operation to display a coordinate value set of the plotted point data table 135 is performed (Step S31; YES), the CPU 11 specifies one list number therein in response to a user operation (Step S32).

Next, the CPU 11 determines whether or not the displacements ($\Delta(X,Y)$) are correlated with the specified list number in the displacement table 136 (Step S33). When determining that the displacements ($\Delta(X,Y)$) are not correlated with the specified list number in the displacement table 136 (Step S33; NO), the CPU 11 displays the coordinate value set under the specified list number on the display 3 (Step S40), and then moves to Step S41.

On the other hand, when determining that the displacements ($\Delta(X,Y)$) are correlated with the specified list number in the displacement table 136 (Step S33; YES), the CPU 11 determines whether or not an operation to reflect the displacements ($\Delta(X,Y)$) in the coordinate value set under the specified list number is performed (Step S34).

When determining that the operation to reflect the displacements ($\Delta(X, Y)$) in the coordinate value set under the specified list number is not performed (Step S34; NO), the CPU 11 moves to Step S40.

On the other hand, when determining that the operation to reflect the displacements ($\Delta(X,Y)$) in the coordinate value set under the specified list number is performed (Step S34; YES), the CPU 11 adds the displacements ($\Delta(X, Y)$) to the coordinate values (X, Y) under the specified list number (Step S35). Consequently, the coordinate values (X, Y) are changed so that positions of the plotted points P are maintained on the background image before and after the XY coordinate system being translated.

Next, the CPU 11 displays the coordinate value set under the specified list number on the display 3 with the coordinate values changed by the displacements ($\Delta(X, Y)$) displayed in bold-face type (Step S36). Consequently, if the coordinate values of the plotted points P are changed at Step S35 after the display range of the XY coordinate system is translated, a display mode of the coordinate values of the plotted points P is changed before and after the XY coordinate system being translated.

Next, the CPU 11 determines whether or not an operation to create an approximate graph (a fit graph) is performed (Step S41). When determining that the operation to create an approximate graph is not performed (Step S41; NO), the CPU 11 moves to other processing (here, manual correction on the coordinate value data or the like).

On the other hand, when determining that the operation to create an approximate graph is performed (Step S41; YES), the CPU 11 selects a type of an approximate graph (a type of a function expression; for example, a linear function expression or a quadratic function expression) in response to a user operation (Step S42).

Next, the CPU 11 obtains the coordinate values of the plotted points P, and then creates an approximate graph for the set of the plotted points P by regression calculation (Step S43), and determines whether or not an operation to draw the approximate graph is performed (Step S44).

When determining that the operation to draw the approximate graph is not performed (Step S44; NO), the CPU 11 moves to other processing.

On the other hand, when determining that the operation to draw the approximate graph is performed (Step S44; YES), the CPU 11 displays the XY coordinate system, the plotted points P corresponding to the coordinate values under the specified list number, and the approximate graph in such a way that the XY coordinate system, the plotted points P, and the approximate graph are superimposed on the image of the specified image data 133S (the image display region to which the coordinate system is set), and also displays the expression for the approximate graph on the display 3 (Step S45). Consequently, if the coordinate values of the plotted points P are changed at Step S35 after the display range of the XY coordinate system is translated, display of the plotted points P is updated on the basis of the changed coordinate values. Furthermore, in the state in which the approximate graph is drawn, if the coordinate values of the plotted points P are changed at Step S35 after the display range of the XY coordinate system is translated, display of the approximate graph is updated.

Next, the CPU 11 determines whether or not an operation to redraw the approximate graph is performed (Step S46). When determining that the operation to redraw the approximate graph is performed (Step S46; YES), the CPU 11 moves to Step S41. On the other hand, when determining that the operation to redraw the approximate graph is not performed (Step S46; NO), the CPU 11 moves to Step S11.

When determining that the operation to display a coordinate value set of the plotted point data table 135 is not performed (Step S31; NO), the CPU 11 determines whether or not an ending operation is performed (Step S51).

When determining that the ending operation is not performed (Step S51; NO), the CPU 11 moves to other processing. On the other hand, when determining that the ending operation is performed (Step S51; YES), the CPU 11 ends the image display processing.

[3. Operation Example]

Next, referring to the drawings, the above operation is described to be more specific.

Figure 5A:
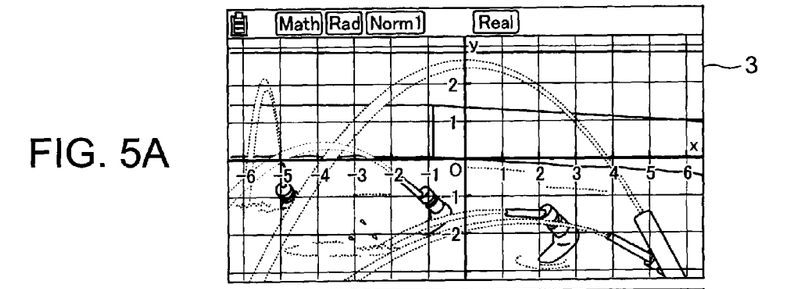
FIG. 5A shows display contents displayed on a display.

First, when a user chooses to activate the picture plot function (Step S1; YES), and specifies one image data 133 in the image file set 131 as the specified image data 133S (Step S2), and it is determined that the coordinate system display range setting data 134 is attached to the specified image data 133S (Step S3; YES), the XY coordinate system is set in such a way as to be superimposed on the image display region on the basis of the display range of the XY coordinate system shown by the coordinate system display range setting data 134 (Step S4), and as shown in FIG. 5A, the image of the specified image data 133S and the XY coordinate system are displayed on the display 3 in such a way as to be superimposed on each other (Step S9).

Figure 5B:
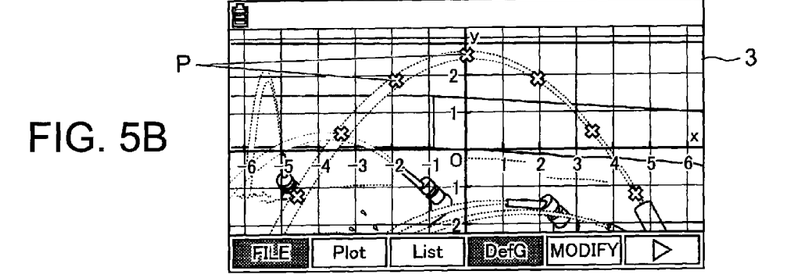
FIG. 5B shows display contents displayed on the display.

Next, when the user performs the operation to form plotted points P on an image (Step S11; YES), and specifies the list number "1" in the plotted point data table 135 (Step S12), as shown in FIG. 5B, the plotted points P are displayed on the image of the specified image data 133S in response to the plotting operation, and coordinate values of the plotted points P in the XY coordinate system are correlated with the specified list number "1", and stored in the plotted point data table 135 (Step S13).

Figure 5C:
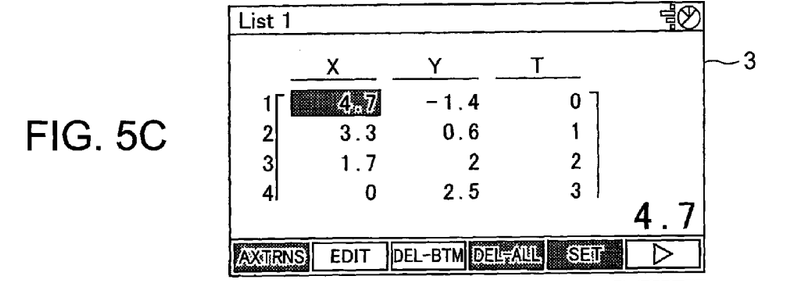
FIG. 5C shows display contents displayed on the display.
Figure 5D:
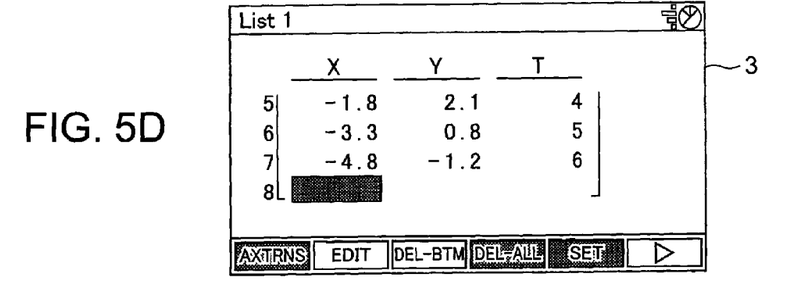
FIG. 5D shows display contents displayed on the display.

When the user performs the operation to display a coordinate value set of the plotted point data table 135 (Step S31; YES), and specifies the list number "1" (Step S32), as shown in FIGS. 5C and 5D, the coordinate value set under the specified list number "1" is displayed on the display 3 (Step S40).

Figure 6A:
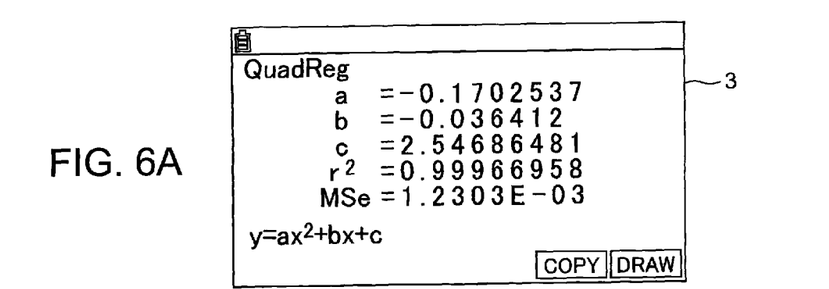
FIG. 6A shows display contents displayed on the display.

Next, when the user performs the operation to create an approximate graph (Step S41; YES), and selects the "quadratic function expression" as a type of an approximate graph (Step S42), the coordinate values of the plotted points P are obtained, and as shown in FIG. 6A, the expression for the approximate graph for the set of the plotted points P, "y=ax$^2$+bx+c:a=−0.17..., b=−0.036..., c=2.546...", and the other coefficients of the regression expression, "r$^2$, MSe", are calculated by regression calculation (Step S43).

Figure 6B:
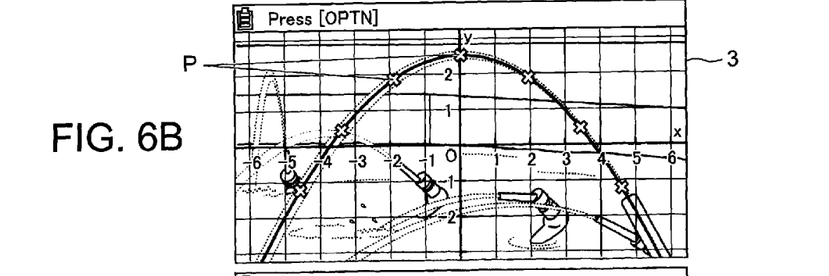
FIG. 6B shows display contents displayed on the display.

Next, when the user performs the operation to draw the approximate graph (Step S44; YES), as shown in FIG. 6B, the XY coordinate system, the plotted points P corresponding to the coordinate values under the specified list number "1", and the approximate graph are displayed in such a way as to be superimposed on the image of the specified image data 133S (Step S45). The expression for the approximate graph is not shown in FIG. 6B. However, the expression for the approximate graph, "y=ax$^2$+bx+c:a=−0.17..., b=−0.036..., c=2.546...", shown in FIG. 6A may be displayed with the approximate graph.

Figure 6C:
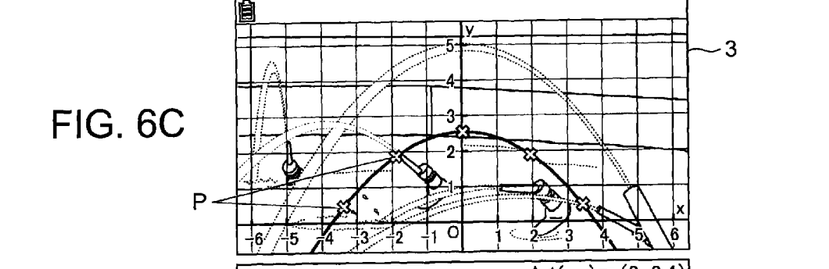
FIG. 6C shows display contents displayed on the display.

When the user performs the operation to translate the XY coordinate system (Step S21; YES), as shown in FIG. 6C, on the basis of a user operation, the XY coordinate system is translated for "−2.4" in the Y axis direction on the image of the specified image data 133S with the image thereof fixed on the display 3 (Step S22). Consequently, the display range of the XY coordinate system is changed (translated).

Next, the displacements in the X axis direction and the Y axis direction, "Δ1(X, Y)=(0, 2.4)", are displayed on the display 3, and the displacements (0, 2.4), the displacement number (Δ1) showing the number of times the XY coordinate system has been translated, and the list number "1" for the coordinate value set of the plotted points P before the XY coordinate system being translated are correlated with each other and stored in the displacement table 136 (Step S23).

Figure 6D:
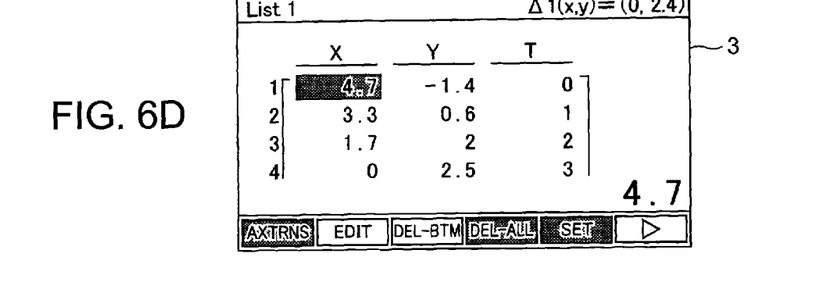
FIG. 6D shows display contents displayed on the display.

When the user performs the operation to display a coordinate value set of the plotted point data table 135 (Step S31; YES), and specifies the list number "1" (step S32), it is determined that the displacements "Δ1(X, Y)=(0, 2.4)" are correlated with the specified list number "1" in the displacement table 136 (Step S33; YES). In this operation example, as shown in FIG. 6D, in addition to the coordinate value set under the specified list number "1", the displacements "Δ1(X, Y)=(0, 2.4)" correlated with the list number "1" in the displacement table 136 is displayed on the display 3.

Figure 7A:
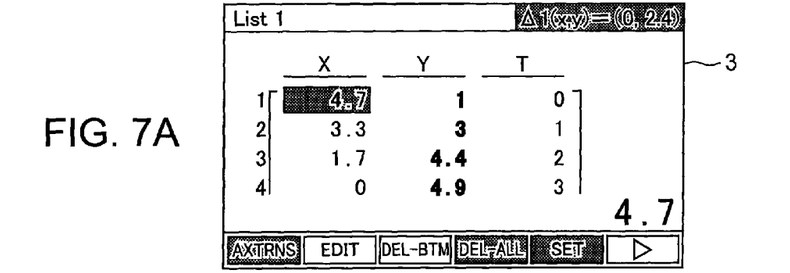
FIG. 7A shows display contents displayed on the display.

Next, when the user performs the operation to reflect the displacements "Δ1(X,Y)=(0, 2.4)" in the coordinate value set under the specified list number "1" (Step S34; YES), the displacements "Δ1(X, Y)=(0, 2.4)" are added to the coordinate values (X, Y) under the specified list number "1" (Step S35), and as shown in FIG. 7A, the coordinate value set under the specified list number "1" is displayed on the display 3 with the coordinate values changed by the displacements (Δ(X,Y)) displayed in bold-faced type (Step S36). In this operation example, the displacements "Δ1(X, Y)=(0, 2.4)" reflected in the coordinate value set are displayed on the display 3 by shading.

Figure 7B:
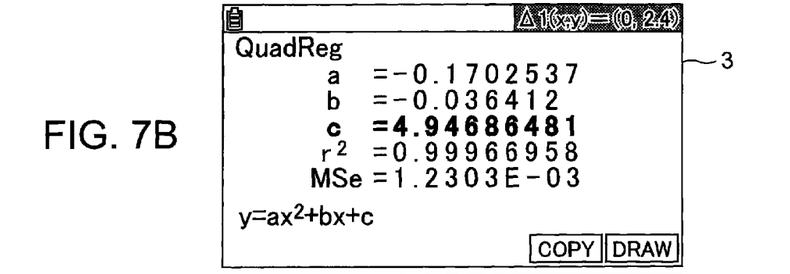
FIG. 7B shows display contents displayed on the display.

Next, when the user performs the operation to create an approximate graph (Step S41; YES), and selects the "quadratic function expression" as a type of an approximate graph (Step S42), the coordinate values of the plotted points P are obtained, and as shown in FIG. 7B, the expression for the approximate graph for the set of the plotted points P, "y=ax$^2$+bx+c:a=−0.17..., b=−0.036..., c=4.946...", and the other coefficients of the regression expression, "r$^2$, MSe", are calculated by regression calculation (Step S43).

Figure 7C:
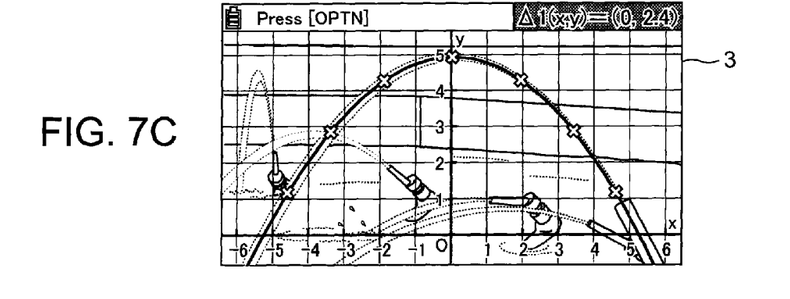
FIG. 7C shows display contents displayed on the display.

Next, when the user performs the operation to draw the approximate graph (Step S44; YES), as shown in FIG. 7C, the XY coordinate system, the plotted points P corresponding to the coordinate values under the specified list number "1", and the approximate graph are displayed in such a way as to be superimposed on the image of the specified image data 133S (Step S45). Consequently, if the coordinate values of the plotted points P are changed after the display range of the XY coordinate system is translated, display of the plotted points P is updated on the basis of the changed coordinate values. Furthermore, in the state in which the approximate graph is drawn, if the coordinate values of the plotted points P are changed after the display range of the XY coordinate system is translated, display of the approximate graph is updated. The expression for the approximate graph is not shown in FIG. 7C. However, the expression for the approximate graph, "$y=ax^2+bx+c:a=-0.17\ldots, b=-0.036\ldots, c=4.946\ldots$", shown in FIG. 7B may be displayed with the approximate graph.

As described above, according to the scientific calculator 1 in the embodiment, as shown by Steps S11 to S45 in FIGS. 3 and 4, FIGS. 5A to 7C, and the like, when a plurality of plotted points P is formed in a coordinate system on the basis of a user operation, coordinate values of the plotted points P in the coordinate system are obtained, an approximate graph for the set of the plotted points P is calculated, the approximate graph is displayed in the coordinate system, and the expression for the approximate graph is displayed on the display 3. In this state, if, on the basis of a user operation, the display range of the coordinate system is displaced, the display range being set on an image in the display screen, with the image fixed, the coordinate values of the plotted points P are changed in accordance with displacements in directions of the coordinate axes of the display range so that positions of the plotted points P on the image are maintained before and after the display range being translated, display of the plotted points P is updated on the basis of the changed coordinate values, and display contents about the approximate graph are updated on the basis of a user operation. Consequently, even when a coordinate system superimposed on an image is translated, positions of plotted points P on the image are maintained, coordinate values of the plotted points P in the coordinate system after the coordinate system being displaced are obtained, an approximate graph for the set of the plotted points P is calculated, the approximate graph is displayed in the coordinate system, and the expression for the approximate graph is displayed on the display 3. Accordingly, in the case where a coordinate system superimposed on an image is displaced, time and effort to re-perform plotting on the image can be eliminated.

Needless to say, detailed configurations and operations of the components of the scientific calculator 1 in the embodiment can be appropriately modified without departing from the scope of the present invention. For example, in the embodiment, the coordinate system having two axes, the X axis and the Y axis, is described. However, the coordinate system may be a three-dimensional coordinate system having three axes, the X axis, the Y axis, and the Z axis. Furthermore, instead of a certesian coordinate system, which is determined by coordinate axes intersecting at right angles, a polar coordinate system, which is determined by $r$, $\theta$, and the like, may be used.

Furthermore, for example, in the embodiment, the scientific calculator 1 is described as the image display device of the present invention. However, products to which the present invention is applicable are not limited thereto. The present invention is applicable to electronic devices in general, such as a mobile phone, a personal computer, a PDA (Personal Digital Assistant), and a game machine. Furthermore, the image display program 130 of the present invention may be stored in a memory card, a CD or the like which is attachable to the scientific calculator 1.

In the above, an embodiment and an operation example of the present invention are described. However, the scope of the present invention is not limited thereto, and hence includes the scope of claims attached below and equivalences thereof.

This application is based upon and claims the benefit of priority under 35 USC 119 of Japanese Patent Application No. 2011-182291 filed on Aug. 24, 2011, the entire disclosure of which, including the description, claims, drawings, and abstract, is incorporated herein by reference in its entirety.

What is claimed is:

1. An image display device comprising:
    a display device which includes a display screen;
    a memory in which a background image is stored in association with data on a display range of a coordinate system; and
    a CPU which is configured to carry out functions comprising:
        displaying the background image on the display screen;
        based on the data on the display range of the coordinate system stored in association with the background image, setting the coordinate system determined by a plurality of coordinate axes superposed on a display region of the background image on the display screen;
        when a plurality of plotted points are set by a user operation on the display region on which the coordinate system is set, storing, in the memory, coordinate values of the plurality of plotted points in the coordinate system;
        creating an approximate graph for a set of the plurality of plotted points;
        displaying the approximate graph superposed on the background image on the display region on which the coordinate system is set;
        displaying an expression for the approximate graph on the display screen;
        displacing, based on a user operation, the display range of the coordinate system which is settable on the background image, with the background image fixed with respect to a point of the display screen;
        storing, in the memory, a plurality of displacements which are in directions of the coordinate axes and by which the display range is displaced, wherein the plurality of displacements are correlated with the set of the plurality of plotted points stored in the memory; and
        updating a display content displayed on the display screen by:
            changing the coordinate values of the plurality of plotted points in accordance with the plurality of displacements, so as to maintain positions of the plurality of plotted points on the background image before and after the display range is displaced, and
            updating display of the plurality of plotted points based on the changed coordinate values in a state in which the background image is fixed with respect to the display screen and displayed on the display screen.

2. The image display device according to claim 1, wherein the CPU is further configured to carry out a function comprising displaying the plurality of displacements by which the display range is displaced on the display screen.

3. The image display device according to claim 1, wherein the CPU is further configured to carry out functions comprising:
    displaying the coordinate values of the plurality of plotted points on the display screen based on a user operation; and
    in response to the display range being displaced, changing a display mode of the coordinate values before and after the display range is displaced.

4. The image display device according to claim 1, wherein the CPU is further configured to carry out a function comprising specifying, based on a user operation, a coordinate value set as a display target from among a plurality of coordinate value sets which are stored in the memory.

5. An image display method of a computer, which includes a display device that includes a display screen and a memory in which a background image is stored in association with data on a display range of a coordinate system, the method comprising:
- displaying the background image on the display screen;
- based on the data on the display range of the coordinate system stored in association with the background image, setting the coordinate system determined by a plurality of coordinate axes superposed on a display region of the background image on the display screen;
- when a plurality of plotted points are set by a user operation on the display region on which the coordinate system is set, storing, in the memory, coordinate values of the plurality of plotted points in the coordinate system;
- creating an approximate graph for a set of the stored plurality of plotted points;
- displaying the approximate graph superposed on the background image on the display region on which the coordinate system is set;
- displaying an expression for the approximate graph on the display screen;
- displacing, based on a user operation, the display range of the coordinate system which is settable on the background image, with the background image fixed with respect to a point of the display screen;
- storing, in the memory, a plurality of displacements which are in directions of the coordinate axes and by which the display range is displaced, wherein the plurality of displacements are correlated with the set of the plurality of plotted points stored in the memory; and
- updating a display content displayed on the display screen by:
  - changing the coordinate values of the plurality of plotted points in accordance with the stored plurality of displacements, so as to maintain positions of the plurality of plotted points on the background image before and after the display range is displaced, and
  - updating display of the plurality of plotted points based on the changed coordinate values in a state in which the background image is fixed with respect to the display screen and displayed on the display screen.

6. A non-transitory computer-readable recording medium having stored thereon an image display control program that is executable by a computer which includes a display device that includes a display screen and a memory in which a background image is stored in association with data on a display range of a coordinate system, the image display control program causing the computer to perform functions comprising:
- displaying the background image on the display screen;
- based on the data on the display range of the coordinate system stored in association with the background image, setting the coordinate system determined by a plurality of coordinate axes superposed on a display region of the background image on the display screen;
- when a plurality of plotted points are set by a user operation on the display region on which the coordinate system is set, storing, in the memory, coordinate values of the plurality of plotted points in the coordinate system;
- creating an approximate graph for a set of the plurality of plotted points;
- displaying the approximate graph superposed on the background image on the display region on which the coordinate system is set;
- displaying an expression for the approximate graph on the display screen;
- displacing, based on a user operation, the display range of the coordinate system which is settable on the background image, with the background image fixed with respect to a point of the display screen;
- storing, in the memory, a plurality of displacements which are in directions of the coordinate axes and by which the display range is displaced, wherein the plurality of displacements are correlated with the set of the plurality of plotted points stored in the memory; and
- updating a display content displayed on the display screen by:
  - changing the coordinate values of the plurality of plotted points in accordance with the plurality of displacements, so as to maintain positions of the plurality of plotted points on the background image before and after the display range is displaced, and
  - updating display of the plurality of plotted points based on the changed coordinate values in a state in which the background image is fixed with respect to the display screen and displayed on the display screen.

* * * * *